(12) United States Patent
Beckman et al.

(10) Patent No.: US 9,731,839 B1
(45) Date of Patent: Aug. 15, 2017

(54) AERIAL VEHICLE DELIVERY SHROUD

(71) Applicant: Amazon Technologies, Inc., Seattle, WA (US)

(72) Inventors: Brian C. Beckman, Newcastle, WA (US); Allan Ko, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 53 days.

(21) Appl. No.: 14/975,623

(22) Filed: Dec. 18, 2015

(51) Int. Cl.
*B64D 47/00* (2006.01)
*B64C 39/02* (2006.01)
*B64D 1/08* (2006.01)
*B64C 19/00* (2006.01)

(52) U.S. Cl.
CPC ............. *B64D 47/00* (2013.01); *B64C 19/00* (2013.01); *B64C 39/024* (2013.01); *B64D 1/08* (2013.01); *B64C 2201/128* (2013.01)

(58) Field of Classification Search
CPC .......... B64D 1/08; B64D 47/00; B64C 19/00; B64C 39/024; B64C 2201/128
See application file for complete search history.

(56) References Cited

U.S. PATENT DOCUMENTS

| | | | |
|---|---|---|---|
| 9,321,531 B1* | 4/2016 | Takayama | B64D 1/12 |
| 2016/0152345 A1* | 6/2016 | Molnar | B64C 39/024 244/39 |
| 2017/0011333 A1* | 1/2017 | Greiner | G06Q 10/083 |

\* cited by examiner

*Primary Examiner* — Aaron L Troost
(74) *Attorney, Agent, or Firm* — Athorus, PLLC (57) ABSTRACT

Described is an aerial vehicle, such as an unmanned aerial vehicle ("UAV") that includes a delivery shroud. The delivery shroud may be maintained in a retracted position while the aerial vehicle is in transit. The delivery shroud reduces the transmission of sound from the aerial vehicle to the delivery area. Likewise, the delivery shroud may also be used to facilitate delivery of a payload from the aerial vehicle to a delivery location within the delivery area.

20 Claims, 7 Drawing Sheets

FIG. 7

AERIAL VEHICLE DELIVERY SHROUD

BACKGROUND

Many companies package items and/or groups of items together for a variety of purposes, such as e-commerce and mail-order companies that package items (e.g., books, CDs, apparel, food, etc.) to be shipped to fulfill orders from users. Retailers, wholesalers, and other product distributors (which may collectively be referred to as distributors) typically maintain an inventory of various items that may be ordered by users. A ground-based building, such as a materials handling facility, may maintain, process and ship such inventory.

Typically ordered items are packed in shipping packages (e.g., corrugated boxes) and shipped to the user's residence or place of business. Physical delivery of items to user specified locations has improved dramatically over the years, with some retailers offering next day delivery of ordered items. The final or last mile delivery of physical items to a user specified location is traditionally accomplished using a human controlled truck, bicycle, cart, etc. For example, a user may order an item for delivery to their home. The item may be picked from a ground-based materials handling facility, packed and shipped to the user for final delivery by a shipping carrier. The shipping carrier will load the item onto a truck that is driven by a human to the final delivery location and the human driver, or another human companion with the driver, will retrieve the item from the truck and complete the delivery to the destination. For example, the human may hand the item to a recipient, place the item on the user's porch, store the item in a post office box, etc.

DETAILED DESCRIPTION

Described is an aerial vehicle, such as an unmanned aerial vehicle ("UAV") that includes a delivery shroud. The delivery shroud may be maintained in a retracted position while the aerial vehicle is in transit. When the aerial vehicle arrives at a delivery area, the shroud is extended from the underneath side of the aerial vehicle as the aerial vehicle descends. In some implementations, the shroud includes an acoustic dampening material that blocks or reduces the transmission of sound generated by the aerial vehicle from beyond the perimeter of the delivery shroud. Likewise, the delivery shroud may be shaped so that sound generated by the aerial vehicle is reflected off the interior of the surface of the shroud in an upward direction, away from the delivery area.

In some implementations, the shroud may also act as a channel through which a payload, such as an ordered item, may be passed to facilitate delivery of the item to a delivery location within the delivery area. For example, the interior of the shroud may include ridges such that when the payload is released from the aerial vehicle it travels through the interior of the shroud, deflecting off the interior ridges, and out of the bottom of the delivery shroud. When the payload exits the delivery shroud, the payload comes to rest at the delivery location (e.g., on a table, porch, driveway, sidewalk, and lawn). The deflection off the interior ridges of the delivery shroud slows the descent of the payload so that the payload, or an item contained therein, is not damaged when it comes to rest at the delivery location. When delivery of the payload is complete, the aerial vehicle departs the delivery area. When the aerial vehicle has departed the delivery area, the delivery shroud may be retracted, thereby improving the aerodynamics of the aerial vehicle while it is in transit from the delivery area.

A delivery area, as used herein, refers to a three dimensional area within which a payload is to be delivered. The delivery area may have any shape, size, or configuration. For example, the delivery area may correspond to a geographic area surrounding a residential address to which an item is to be delivered by the aerial vehicle. The geographic area may include both the surface area around and including the residential address as well as the airspace above the residential address. In some implementations, the airspace included in the delivery area may include airspace above the surface and up to a defined altitude (e.g., fifty feet).

A delivery location, as used herein, refers to a specific location within the delivery area at which a payload is delivered. For example, the delivery location may correspond to specific longitudinal and latitudinal coordinates that are maintained and/or provided to the aerial vehicle. In another example, the delivery location may correspond to an identifiable marker that is positioned within the delivery area to indicate a desired delivery location. In still another example, the aerial vehicle may process images and/or other information corresponding to the delivery area to determine a location within the area that is suitable for delivery of the payload and specify that area as the delivery location.

Figure 1:
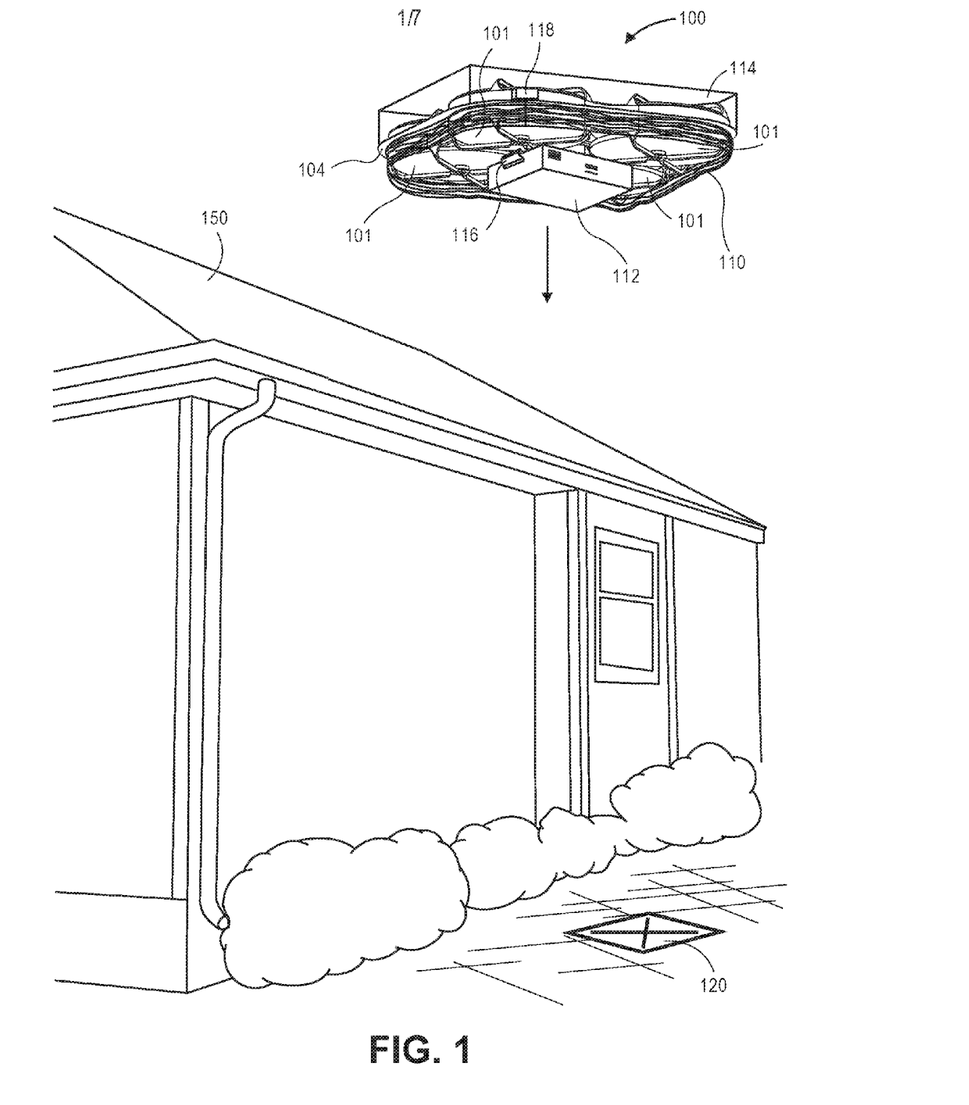
FIG. 1 is a view of an aerial vehicle arriving at a delivery location, according to an implementation.

FIG. 1 is a view of an aerial vehicle 100 that includes a delivery shroud 110 arriving at a delivery area that includes a structure (e.g., residence). The aerial vehicle may be any type of aerial vehicle, such as UAV. In the illustrated example, the aerial vehicle 100 includes four propulsion mechanisms 101 that, in this example, are propellers that are rotated by motors. In other implementations, other forms of propulsion mechanisms may be utilized. For example, the aerial vehicle may be propelled using one or more of engines, fans, jets, turbojets, turbo fans, jet engines, and/or the like.

The aerial vehicle also includes a frame 104 to which the propulsion mechanisms 101 are coupled. The frame may extend around and form a perimeter of the aerial vehicle, and/or may extend around each of the propulsion mechanisms 101. Likewise, other components of the aerial vehicle may be coupled to the frame, such as the aerial vehicle control system, which is discussed below with respect to FIG. 7, sensors, power modules, navigation components, etc.

The delivery shroud is coupled to the frame 104 and positioned so that it extends around the perimeter of at least one of the propulsion mechanisms 101. In the example illustrated in FIGS. 1-3, the delivery shroud 110 is coupled to the frame 104 and extends around the entire perimeter of the aerial vehicle 100, including all four of the propulsion mechanisms. In some implementations, the delivery shroud may be permanently affixed to the frame 104. For example, when the frame is formed, the delivery shroud 110 may be included in the formation of the frame 104 so that an end of the delivery shroud is embedded within the frame 104. In other implementations, the delivery shroud may be temporarily coupled to the aerial vehicle. For example, the delivery shroud may be glued, secured with hook and loop fasteners (e.g., VELCRO®), screws, tabs, snaps, etc.

Figure 2:
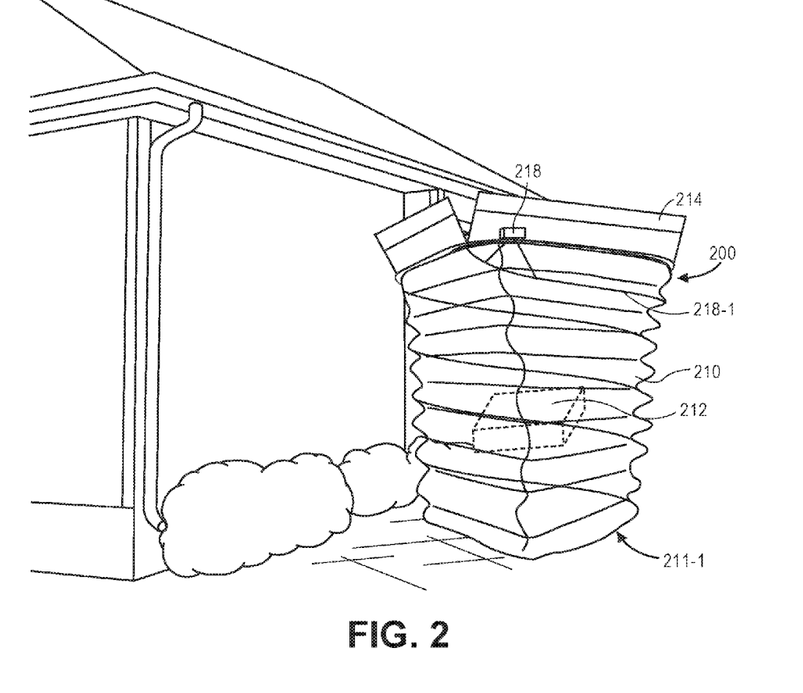
FIG. 2 is a view of an aerial vehicle with a delivery shroud delivering a payload at the delivery location, according to an implementation.
Figure 3:
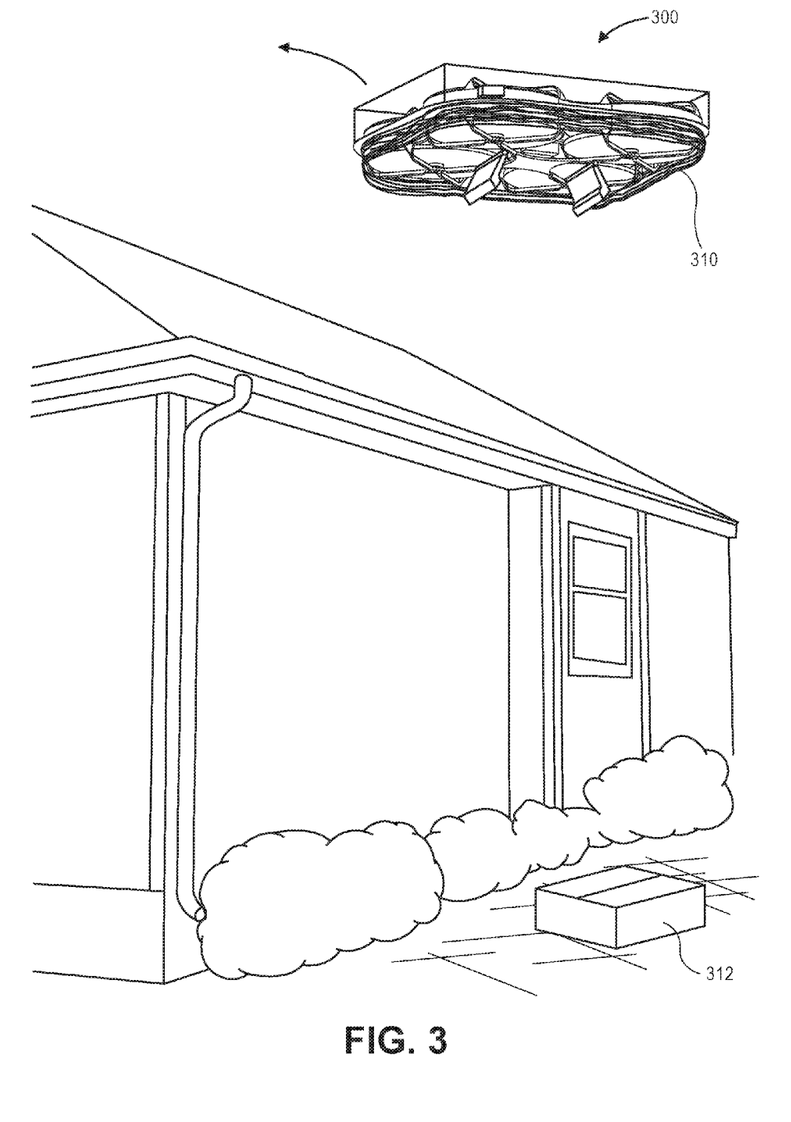
FIG. 3 is a view of an aerial vehicle departing a delivery location after delivering the payload, according to an implementation.

The delivery shroud may also include one or more drive mechanisms 118 (e.g., pulleys, cables, gears) that are configured to move the delivery shroud between a retracted position, as illustrated in FIG. 1 and FIG. 3, and an extended position, as illustrated in FIG. 2. The delivery shroud may be formed of any flexible material that will allow the delivery shroud 110 to be moved between a retracted position and the extended position. As discussed further below with respect to FIG. 2, in some implementations, the flexible material may be selected for its sound reflection, sound dampening, sound absorption, and/or sound dispersion properties.

When the aerial vehicle 100 is navigating to and arriving at a delivery area the delivery shroud 110 may be maintained in a retracted position, as illustrated. Maintaining the delivery shroud 110 in a retracted position improves the aerodynamics of the aerial vehicle 100, which reduces the power required to aerially navigate the aerial vehicle. In some implementations, the delivery shroud may be maintained in the retracted position at any time in which the aerial vehicle is moving in a substantially horizontal direction, when the aerial vehicle is above a defined altitude (e.g., twenty-five feet), in an area that is not populated by humans, when a measured sound of the aerial vehicle is below a defined allowable sound level, etc.

The aerial vehicle 100 may also include a payload engagement mechanism 116 that is coupled to an underneath side of the frame 104 and configured to selectively engage and disengage a payload 112. The payload 112 may be any item (e.g., container, package) that can be engaged by the payload engagement mechanism 116 and aerially navigated by the aerial vehicle 100 to a delivery area. In some implementations, the payload 112 may be a container that contains an item ordered for an electronic commerce (e-commerce) website and scheduled for delivery to the delivery area. In other implementations, the payload 112 may be the item that is ordered from the e-commerce website—i.e., the item may not be contained in a separate container. As discussed below, the payload engagement mechanism 116 may be controlled by a payload engagement controller (not shown) that controls the engagement and disengagement of a payload 112. In one implementation, the average size of a payload may be approximately five inches, by approximately five inches, by approximately ten inches. In other implementations, the payload may be larger or smaller.

In some implementations, the aerial vehicle 100 may also include one or more sound deflectors 114 coupled to the frame and extending above the aerial vehicle. The sound deflectors 114 may be a rigid material that can be rotated or extended upward above the aerial vehicle 100 to channel sound generated by the aerial vehicle upward and away from the delivery area.

The delivery area may be any area to which a payload may be delivered using an aerial vehicle. For example, the delivery area may be a land-based area that includes a structure 150, such as a personal residence, business office, etc. Alternatively, the delivery area may be a ground-based area that does not include a structure. For example, the delivery area may include a park, field, etc. In still another example, the delivery area may include a water-based vehicle, such as a boat or a ship. In general, a delivery area is any area to which a payload may be delivered by an aerial vehicle. As discussed above, each delivery area will include a delivery location to which the payload will be disengaged by the aerial vehicle and come to rest within the delivery area. In some implementations, the delivery location may be designated by a physical identifier 120. In other implementations, the delivery location may be designed by geographic coordinates, etc.

Referring now to FIG. 2, illustrated is an aerial vehicle 200 that includes a delivery shroud 210, according to an implementation. The example illustrated is a continuation of the discussion with respect to FIG. 1 and shows the aerial vehicle at the delivery area and delivering the payload 212 to the delivery location within the delivery area. As discussed further below with respect to FIG. 6, when the aerial vehicle 200 descends below a defined altitude, into the delivery area, exceeds an allowable sound level, etc., the delivery shroud 210 may be moved from the retracted position to the extended position, as illustrated in FIG. 2. When the delivery shroud is in the extended position, one end of the delivery shroud remains attached to the aerial vehicle and the delivery shroud 210 extends downward away from the underneath side of the aerial vehicle 200 forming a column that includes a cavity 211-1 through which airflow from the aerial vehicle may pass.

The delivery shroud 210 may have any shape and/or length that extends from the aerial vehicle 200. For example, the delivery shroud, when extended may be approximately six feet five inches long and have a shape that is tapered so that it is narrower toward the bottom of the delivery shroud 210 than toward the top of the delivery shroud 210 that is coupled to the aerial vehicle 200. In other implementations, the delivery shroud may not be tapered and/or may have another shape.

In some implementations, the delivery shroud is extended by the drive mechanism 218 releasing or extending a cable 218-1 (e.g., wire, rope) that is incorporated into the material of the delivery shroud. As the cable 218-1 is extended, the weight of the delivery shroud extends the delivery shroud downward away from the aerial vehicle.

When the delivery shroud is in the extended position, the delivery shroud 210 reduces a transmission of sound generated by the aerial vehicle and/or the propulsion mechanism(s) of the aerial vehicle toward an area below the aerial vehicle, such as the delivery area. For example, the delivery shroud may influence at least a portion of the sound waves such that the influenced sound waves do not travel in a direction of the delivery area. For example, the material of the delivery shroud may be selected to reflect, dampen, absorb, and/or disperse the sound. As the sound waves emanating from the aerial vehicle contact the material of the delivery shroud, the material influences the sound waves, thereby reducing the transmission of the sound waves toward the delivery area.

The delivery shroud may be formed of any flexible material, such as a Kevlar material, a foam material, a fabric material, a plastic material, a synthetic material, a wool material, a cotton material, a fiber material, a feather, a polyethylene material, sawdust, a paper material, a fiberglass material, etc. In some implementations, the interior of the delivery shroud that forms the cavity within the column may be formed of a first material, such as a sound reflecting material, and an outer portion of the delivery shroud may be formed of a second material, such as a sound absorbing material. Likewise, the interior of the delivery shroud, when in the expanded position, may include ridges that are oriented to reflect the sound waves upward toward the aerial vehicle and away from the delivery area. In other implementations, the interior of the delivery shroud may include baffles, open cells, etc., to dampen or reduce the sound.

In implementations in which the aerial vehicle 200 includes sound deflectors 214 extending above the aerial vehicle, the sound deflectors 214 may be extended and/or oriented outward to channel or further direct the sound up and away from the delivery area.

In addition to the delivery shroud 210 reducing the transmission of sound from the aerial vehicle toward the delivery area, the delivery shroud may also be used as part of the payload delivery process. For example, as the aerial vehicle continues to descend, the delivery shroud will approach the delivery location. When the delivery engagement controller sends instructions to the delivery engagement mechanism to disengage the payload, the payload will be released and travel through the cavity 211-1 of the delivery shroud 210 and come to rest at the delivery location. In some implementations, the ridges within the cavity of the delivery shroud 210 may extend far enough into the cavity so that the payload will contact the ridges as it travels through the delivery shroud 210, thereby slowing the rate of descent of the payload. The slower rate of descent allows the payload to be released from a higher altitude without the payload being damaged when it comes to rest at the delivery location.

Likewise, the delivery shroud provides a protective barrier below the aerial vehicle so that the aerial vehicle can descend safely. In some implementations, the bottom and/or other portions of the delivery shroud may include sensors, such as contact sensors, that communicate with the aerial vehicle control system. If the sensors detect an object contacting the delivery shroud 210, the sensors may provide an alert to the aerial vehicle control system. Such an alert acts as an earlier warning to the aerial vehicle as to the presence of an object. The aerial vehicle, upon receiving an alert from a sensor on the delivery shroud 210, may terminate descent and/or abort delivery of the payload. Likewise, because the delivery shroud is formed of a flexible material, contact between the delivery shroud and the object will not likely result in damage to the object or the delivery shroud.

Still further, the delivery shroud 210 may increase the altitude at which the aerial vehicle will experience ground effect. Ground effect is a well-known phenomenon that occurs when an aerial vehicle flies at a level that is approximately at or below the length of the aerial vehicles wingspan or propeller diameter. When flying at those low levels, the ground disrupts the airflow around the propellers or wings. This alteration results in lower induced drag, which increases the speed and lift of the aerial vehicle, and/or lift generated by the rotation of propellers. The increased lift from the rotating propellers results in the aerial vehicle being able to maintain the low altitude while rotating the propellers at a slower speed. The slower rotation of the propellers reduces the sound generated by the aerial vehicle when the aerial vehicle is close enough to the ground to experience ground effect.

When the delivery shroud 210 is in the extended position, ground effect may be experienced at higher altitudes because the airflow from the propellers passes through the cavity 211-1 of the delivery shroud 210. Some of the airflow passing through the cavity 211-1 will reflect off the ground or surface beneath the delivery shroud 210 back into the cavity 211-1. This reflected airflow within the cavity of the delivery shroud 210 increases lift (e.g., ground effect) such that the rotational speed of the propellers of the aerial vehicle 200 can be reduced, thereby reducing the sound generated by the rotation of the propellers.

FIG. 3 is a view of an aerial vehicle 300 that includes a delivery shroud that has completed delivery of a payload 312 to a delivery location within a delivery area, according to an implementation. The example discussed with respect to FIG. 3 is a continuation of the discussion presented above with respect to FIG. 1 and FIG. 2. As illustrated, the aerial vehicle 300 has completed delivery and is aerially navigating away from the delivery area. When the aerial vehicle has reached the defined altitude, exited the delivery area, or satisfied another condition, the delivery shroud 310 is positioned back to the retracted position. As discussed above, when the delivery shroud is in a retracted position the aerodynamic properties of the aerial vehicle are better than the aerodynamic properties of the aerial vehicle when the delivery shroud is in the extended position.

Utilizing a delivery shroud, such as the delivery shroud discussed herein, allows aerial vehicles, such as a UAV, to navigate into areas and deliver payloads in a manner that reduces the perceived sound of the aerial vehicle to individuals that may be positioned within the delivery area. The delivery shroud also provides additional safety measures to ensure that the aerial vehicle does not impact an object during a delivery of a payload within the delivery area. Likewise, by configuring the delivery shroud such that it can be retracted up toward the aerial vehicle, the aerial vehicle is able to operate in an aerodynamic and efficient manner as it aerially navigates to and from a delivery area, thereby extending the operational range of the aerial vehicle.

Figure 4:
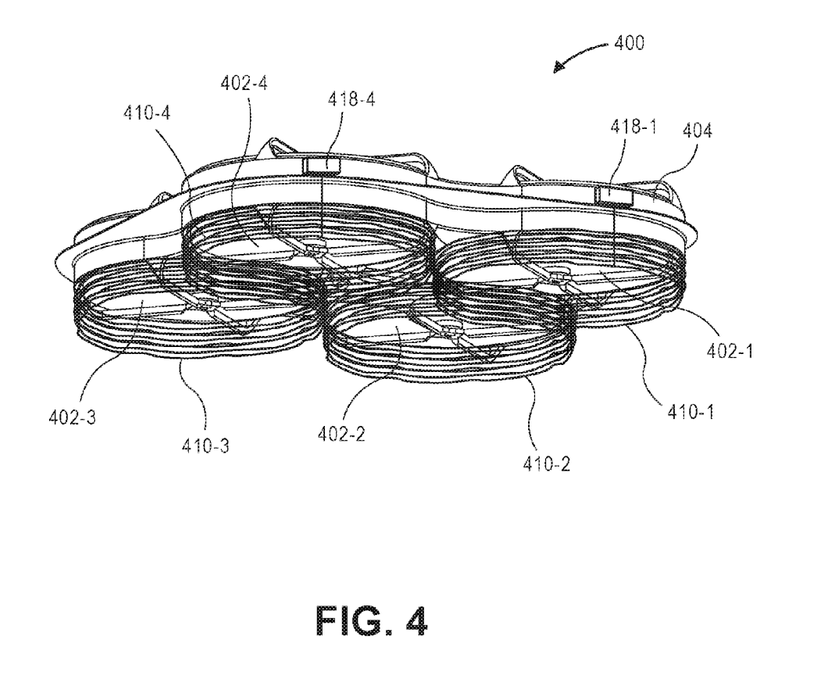
FIG. 4 is a view of an aerial vehicle with retracted delivery shrouds, according to an implementation.

FIG. 4 is a view of an aerial vehicle 400 that includes multiple delivery shrouds 410-1, 410-2, 410-3, and 410-4, according to an implementation. In this example, rather than the aerial vehicle including a single delivery shroud that surrounds all of the propulsion mechanism, each propulsion mechanism 402-1, 402-2, 402-3, and 402-4 is surrounded by a separate delivery shroud 410-1-410-4. For example, the frame 404 may extend around the perimeter of the aerial vehicle 400 and include interior frame components that extend toward the interior or center of the UAV and surround the perimeter of each of the propulsion mechanisms 402-1-402-4. Each delivery shroud 410-1-410-4 is coupled to the frame 404 and surrounds the perimeter of a propulsion mechanism.

Each delivery shroud 410-1-410-4 includes a drive mechanism 418 that may be used to retract or extend the respective delivery shroud. For example, drive mechanism 418-1 may receive instructions for the delivery shroud controller to extend or retract the delivery shroud 410-1 and drive mechanism 418-4 may receive separate instructions to extend or retract the delivery shroud 410-4. As discussed above, the drive mechanisms 418 may include a cable or other component that may be extended or retracted to move a delivery shroud from a retracted position to an extended position.

Figure 5:
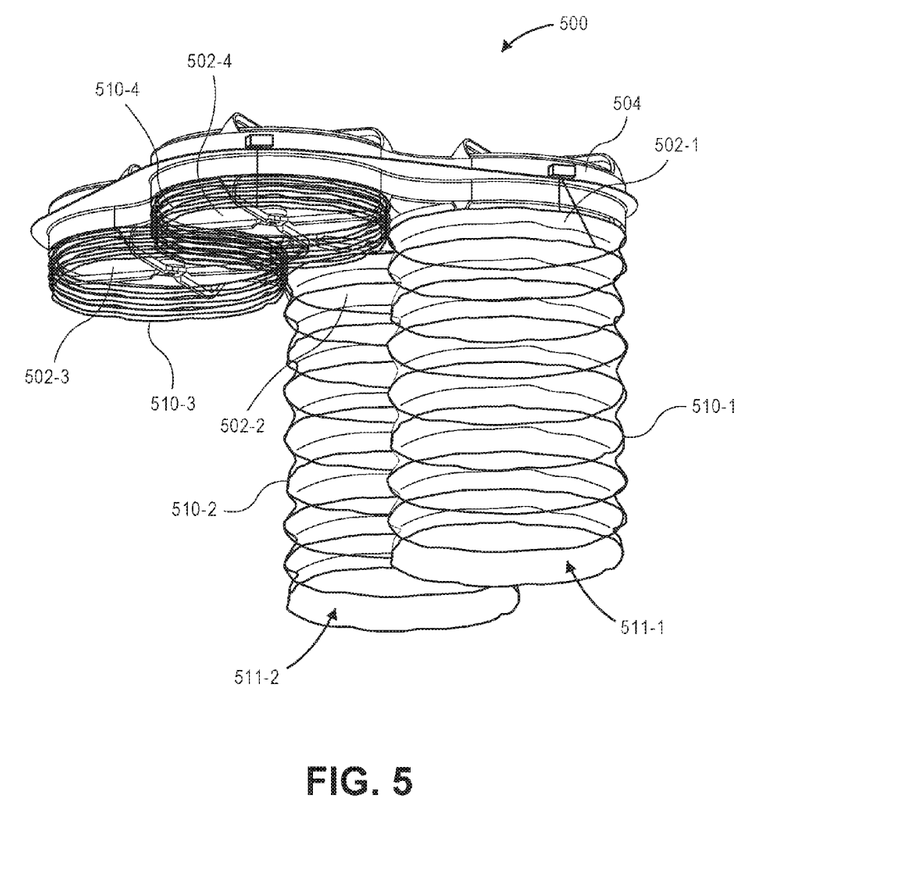
FIG. 5 is a view of the aerial vehicle with some of the delivery shrouds extended and some of the delivery shrouds retracted, according to an implementation.

Including delivery shrouds around each propulsion mechanism that can be independently controlled allows greater flexibility of sound control during operation of the aerial vehicle. Rather than extending all of the delivery shrouds or extending a single delivery shroud that surrounds all of the propulsion mechanisms, one or more of the delivery shrouds may be independently extended or retracted. For example, FIG. 5 illustrates an aerial vehicle 500 that includes four propulsion mechanisms 502-1, 502-2, 502-3, and 502-4 and four delivery shrouds 510-1, 510-2, 510-3, and 510-4, each of which surround a different propulsion mechanism 502-1-502-4. In this example, two of the delivery shrouds 510-3, 510-4 are maintained in a retracted position and two of the delivery shrouds 510-1, 510-2 are in an extended position.

As discussed above, when a delivery shroud is in an extended position the delivery shroud forms a column that includes a cavity 511-1, 511-2 through which airflow from the surrounded propulsion mechanism may pass. Likewise, the material of the delivery shroud influences sound from the aerial vehicle such that at least a portion of the sound is not transmitted toward a delivery area or an area beneath the aerial vehicle 500.

Independent control of multiple delivery shrouds may be beneficial in certain operating environments. For example, if the aerial vehicle is operating during high winds and/or in an area that includes many obstacles (e.g., trees) it may be beneficial to only extend the delivery shrouds that are closest to a portion of the delivery area where sound transmission is to be reduced. For example, if the delivery area includes a personal residence and the aerial vehicle 500 is delivering a payload to a delivery location adjacent the personal residence, the two delivery shrouds 510-1, 510-2 that are closest to the personal residence during delivery of the payload may be moved to an extended position while the delivery shrouds 510-3, 510-4, which are farther away from the personal residence, may be maintained in a retracted position.

By extending the delivery shrouds 510-1, 510-2 that are closest to the personal residence, the sound generated by the propulsion mechanisms 502-1, 502-2 is influenced and at least a portion of that sound is absorbed, reflected away from the personal residence and/or otherwise altered such that the perceived sound at the delivery residence is reduced. Likewise, the exterior of the extended delivery shrouds 510-1, 510-2 may reflect, absorb and/or otherwise influence sound generated from the propulsion mechanisms 502-3, 502-4 such that at least some of the sound from propulsion mechanisms 502-3, 502-4 is reflected, absorbed and/or otherwise directed away from the delivery residence.

While the examples discussed above illustrate either a single shroud that extends around the perimeter of the aerial vehicle and surrounds all of the propulsion mechanisms of the aerial vehicle, or multiple delivery shrouds, each of which surround a separate propulsion mechanism, it will be appreciated that the delivery shrouds affixed to an aerial vehicle may be configured in other manners. For example, delivery shrouds may surround multiple, but not all, of the propulsion mechanisms of an aerial vehicle. For example, if the aerial vehicle includes four propulsion mechanisms, a first delivery shroud may be coupled to the aerial vehicle and surround two of the propulsion mechanisms and a second delivery shroud may be coupled to the aerial vehicle and surround the other two propulsion mechanisms. In a similar manner, in some implementations, not all of the propulsion mechanisms of the aerial vehicle are surrounded by a delivery shroud.

Figure 6:
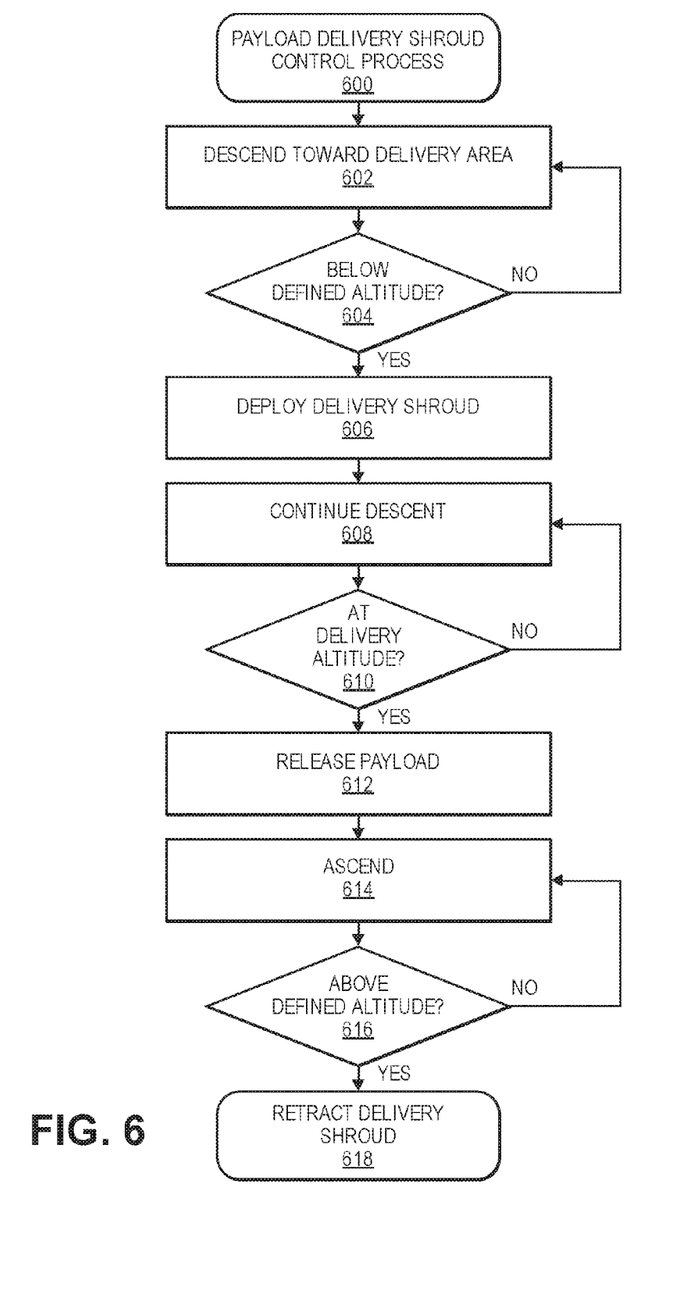
FIG. 6 is a flow diagram illustrating an example delivery shroud control process, according to an implementation.

FIG. 6 is a flow diagram illustrating an example payload delivery shroud control process 600, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 600 begins by determining that an aerial vehicle is descending toward a delivery area, as in 602. When descent begins, a determination is made as to whether the aerial vehicle is below a defined altitude, as in 604. The defined altitude may be any defined altitude and may vary for different aerial vehicles, different delivery areas, different times of day, different environmental conditions, different operating conditions, etc. In some implementations, the defined altitude may be specified based on the sound level of the sound being generated by the aerial vehicle. For example, a sensor on the aerial vehicle may measure a sound around the aerial vehicle during aerial operation of the aerial vehicle. The defined altitude may be based on the measured sound level. For example, the aerial vehicle may maintain or be provided a table of allowable sound levels that are specified for different altitudes. As the sound around the aerial vehicle is measured, the measured sound is compared to the allowable sound level for the current altitude of the aerial vehicle. If the measured sound is below the allowable sound level for the current altitude of the aerial vehicle it will be determined that the aerial vehicle is not below the defined altitude. If the measured sound level is above the allowable sound level for the current altitude of the aerial vehicle it is determined that the aerial vehicle is below the defined altitude. In another example, the defined altitude may be determined based on the location of the delivery area. For example, if the delivery area is a suburban neighborhood, the defined altitude may be at a first altitude (e.g., twenty-five feet). In comparison, if the delivery area is in a rural area, the defined altitude may be lower (e.g., fifteen feet). In still another example, the example process may not determine a defined altitude and may simply determine that the aerial vehicle is positioned above a delivery area and has started a descent toward or into the delivery area. In such an example, the example process 600 may continue when the aerial vehicle starts descent toward or into the delivery area.

If it is determined that the aerial vehicle is not below a defined altitude, the example process 600 returns to block 602 and continues. If it is determined that the aerial vehicle is below the defined altitude, one or more delivery shrouds are moved from a retracted position to an extended position, as in 606. As discussed above, delivery shrouds of an aerial vehicle may be extended to influence sound generated by the aerial vehicle such that the perceived sound at the delivery area is reduced. Likewise, the delivery shrouds provide additional safety measures to reduce any likelihood of the aerial vehicle contacting an object within the delivery area.

As the delivery shroud(s) are extended, the aerial vehicle continues descent toward or into the delivery area, as in 608. As discussed above, the aerial vehicle may descend into a delivery area and toward a delivery location within the delivery area where a payload is to be deployed. The delivery location may be any specific location within the delivery area.

As the aerial vehicle descends, a determination is made as to whether the aerial vehicle has reached a delivery altitude, as in 610. Similar to the defined altitude, the delivery altitude may be any altitude at which release or deployment of a payload carried by the aerial vehicle is to be performed. The delivery altitude may vary for different payloads, different payload engagement mechanisms, different aerial vehicles, etc. For example, in some implementations, the payload engagement mechanism may simply release an engaged payload and the payload will descend from the aerial vehicle to a delivery location under the force of gravity. In such an example, the delivery altitude is specified to be low enough so that the payload is not damaged. Likewise, as discussed above, in some implementations, the payload may travel through the cavity formed by the extended delivery shroud and the configuration of the interior of the delivery shroud may slow the descent of the payload, thereby allowing the delivery altitude to be higher. In other implementations, the payload engagement mechanism may include a cable or arm that may be extended or retracted from the aerial vehicle to lower the payload from the aerial vehicle in a controlled manner and place the payload at the delivery location. In such an example, the delivery altitude may correspond to the length of the cable or arm.

If it is determined that the aerial vehicle has not reached the delivery altitude, the example process returns to block 608 and continues. If it is determined that the aerial vehicle has reached the delivery altitude, instructions are sent that cause the payload engagement mechanism to release the payload, as in 612. When the payload is released, it is transitioned from the aerial vehicle to the delivery location, thereby completing delivery of the payload by the aerial vehicle. After release of the payload, the aerial vehicle begins to ascent away from the delivery area, as in 614. As the aerial vehicle ascends, a determination is made as to whether the aerial vehicle is above a defined altitude, as in 616. The defined altitude determined at decision block 616 may be the same or different than the defined altitude discussed above with respect to decision block 604.

If it is determined that the aerial vehicle has not ascended above the defined altitude, the example process returns to block 614 and continues. If it is determined that the aerial vehicle has ascended above the defined altitude, the extended delivery shroud(s) are moved back to a retracted position so that the aerodynamic properties of the aerial vehicle are improved, as in 618.

Figure 7:
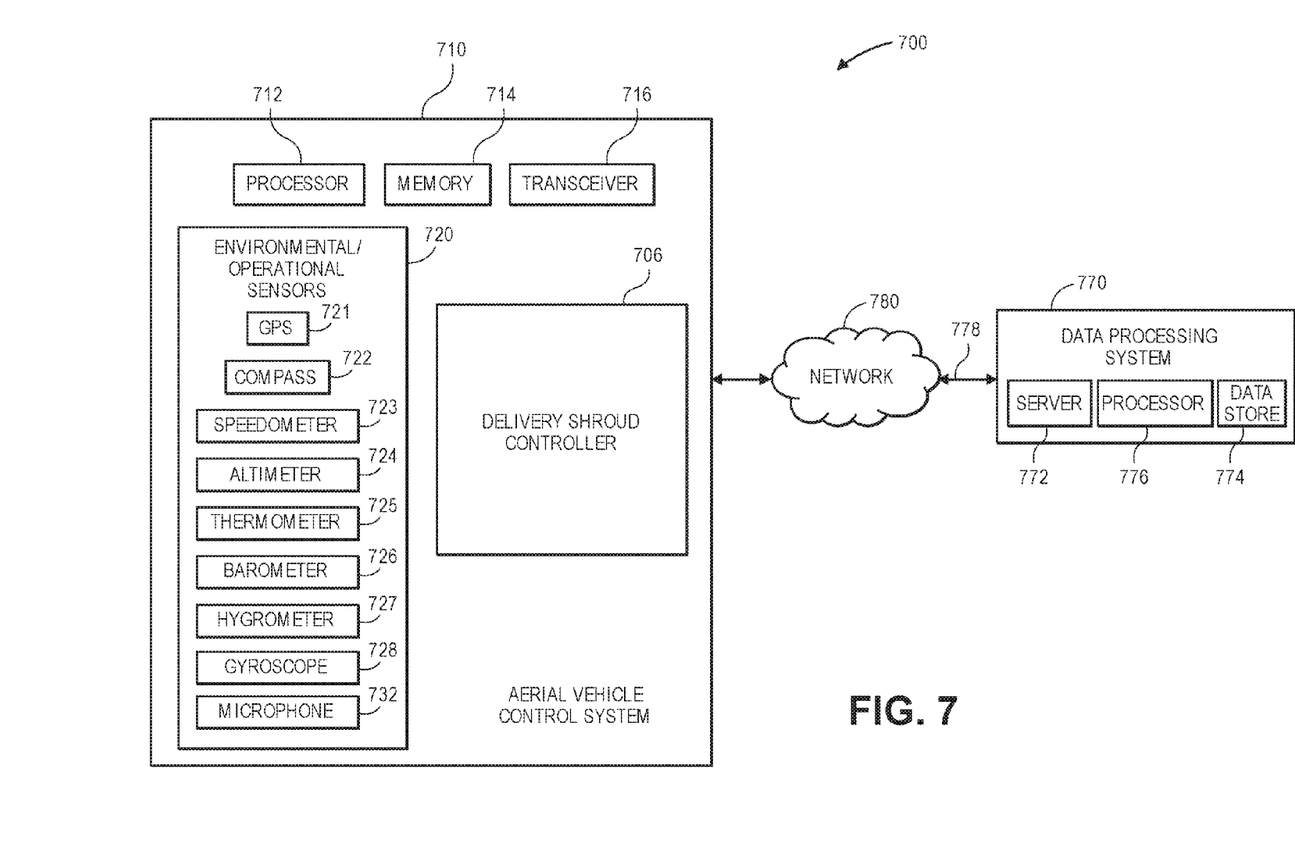
FIG. 7 is a block diagram of one system for active airborne sound control, according to an implementation.

Referring to FIG. 7, illustrated is a block diagram of components of one system 700, in accordance with an implementation. The system 700 of FIG. 7 includes an aerial vehicle control system 710 and a data processing system 770 connected to one another over a network 780. The aerial vehicle control system 710 includes a processor 712, a memory 714 and a transceiver 716, as well as a plurality of sensors 720, and a delivery shroud controller 706.

The processor 712 may be configured to perform any type or form of computing function. For example, the processor 712 may control any aspects of the operation of the aerial vehicle control system 710 and the one or more computer-based components thereon, including but not limited to the transceiver 716, the sensors 720, and/or the delivery shroud controller 706. The aerial vehicle control system 710 may likewise include other controllers (not shown) that may generate instructions for conducting operations thereof, e.g., for operating one or more propulsion mechanisms, rotors, motors, rudders, ailerons, flaps or other components provided thereon. Controllers may be associated with one or more other computing devices or machines, and may communicate with the data processing system 770 or one or more other computer devices (not shown) over the network 780, through the sending and receiving of digital data. The aerial vehicle control system 710 further includes one or more memory or storage components 714 for storing any type of information or data, e.g., instructions for operating the aerial vehicle, allowable sound levels, and/or information or data captured by one or more of the sensors 720.

The transceiver 716 may be configured to enable the aerial vehicle control system 710 to communicate through one or more wired or wireless means, e.g., wired technologies such as Universal Serial Bus (or "USB") or fiber optic cable, or standard wireless protocols, such as Bluetooth® or any Wireless Fidelity (or "Wi-Fi") protocol, such as over the network 780 or directly.

The sensors 720 may include any components or features for determining one or more attributes of an environment in which the aerial vehicle control system 710 is operating, or may be expected to operate, including extrinsic information or data or intrinsic information or data. As is shown in FIG. 7, the sensors 720 may include, but are not limited to, a Global Positioning System ("GPS") receiver or sensor 721, a compass 722, a speedometer 723, an altimeter 724, a thermometer 725, a barometer 726, a hygrometer 727, a gyroscope 728, and/or a microphone 732. The GPS sensor 721 may be any device, component, system or instrument adapted to receive signals (e.g., trilateration data or information) relating to a position of the aerial vehicle from one or more GPS satellites of a GPS network (not shown). The compass 722 may be any device, component, system, or instrument adapted to determine one or more directions with respect to a frame of reference that is fixed with respect to the surface of the Earth (e.g., a pole thereof). The speedometer 723 may be any device, component, system, or instrument for determining a speed or velocity of the aerial vehicle, and may include related components (not shown) such as pitot tubes, accelerometers, or other features for determining speeds, velocities, or accelerations.

The altimeter 724 may be any device, component, system, or instrument for determining an altitude of the aerial vehicle, and may include any number of barometers, transmitters, receivers, range finders (e.g., laser or radar) or other features for determining heights. The thermometer 725, the barometer 726 and the hygrometer 727 may be any devices, components, systems, or instruments for determining local air temperatures, atmospheric pressures, or humidities within a vicinity of the aerial vehicle. The gyroscope 728 may be any mechanical or electrical device, component, system, or instrument for determining an orientation, e.g., the orientation of the aerial vehicle. For example, the gyroscope 728 may be a traditional mechanical gyroscope having at least a pair of gimbals and a flywheel or rotor. Alternatively, the gyroscope 728 may be an electrical component such as a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle. The microphone 732 may be any type or form of transducer (e.g., a dynamic microphone, a condenser microphone, a ribbon microphone, a crystal microphone) configured to convert acoustic energy of any intensity and across any or all frequencies into one or more electrical signals, and may include any number of diaphragms, magnets, coils, plates, or other like features for detecting and recording such energy. The microphone 732 may also be provided as a discrete component, or in combination with one or more other components, e.g., an imaging device, such as a digital camera. Furthermore, the microphone 732 may be configured to detect and record acoustic energy from any and all directions around the aerial vehicle.

Those of ordinary skill in the pertinent arts will recognize that the sensors 720 may include any type or form of device or component for determining an environmental condition within a vicinity of the aerial vehicle in accordance with the present disclosure. For example, the sensors 720 may include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), altitude indicators, depth gauges, accelerometers or the like, as well as one or more imaging devices (e.g., digital cameras), and are not limited to the sensors 721, 722, 723, 724, 725, 726, 727, 728, 732 shown in FIG. 7.

The data processing system 770 includes one or more physical computer servers 772 having a plurality of data stores 774 associated therewith, as well as one or more computer processors 776 provided for any specific or general purpose. For example, the data processing system 770 of FIG. 7 may be independently provided for the exclusive purpose of receiving, analyzing or storing sounds, determining allowable altitudes and/or other information or data received from the aerial vehicle control system 710 or, alternatively, provided in connection with one or more physical or virtual services configured to receive, analyze or store such sounds, information or data, as well as one or more other functions. The servers 772 may be connected to or otherwise communicate with the data stores 774 and the processors 776. The data stores 774 may store any type of information or data, including but not limited to sound information or data, and/or information or data regarding environmental conditions, operational characteristics, or positions, for any purpose. The servers 772 and/or the computer processors 776 may also connect to or otherwise communicate with the network 780, as indicated by line 778, through the sending and receiving of digital data. For example, the data processing system 770 may include any facilities, stations or locations having the ability or capacity to receive and store information or data, such as media files, in one or more data stores, e.g., media files received from the aerial vehicle control system 710, or from one another, or from one or more other external computer systems (not shown) via the network 780. In some implementations, the data processing system 770 may be provided in a physical location. In other such implementations, the data processing system 770 may be provided in one or more alternate or virtual locations, e.g., in a "cloud"-based environment. In still other implementations, the data processing system 770 may be provided onboard one or more aerial vehicles, including but not limited to the aerial vehicle control system 710.

The network 780 may be any wired network, wireless network, or combination thereof, and may comprise the Internet in whole or in part. In addition, the network 780 may be a personal area network, local area network, wide area network, cable network, satellite network, cellular telephone network, or combination thereof. The network 780 may also be a publicly accessible network of linked networks, possibly operated by various distinct parties, such as the Internet. In some implementations, the network 780 may be a private or semi-private network, such as a corporate or university intranet. The network 780 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and, thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle control system 710 or the data processing system 770 may use any web-enabled or Internet applications or features, or any other client-server applications or features including E-mail or other messaging techniques, to connect to the network 780, or to communicate with one another, such as through short or multimedia messaging service (SMS or MMS) text messages. For example, the aerial vehicle control system 710 may be adapted to transmit information or data in the form of synchronous or asynchronous messages to the data processing system 770 or to any other computer device in real time or in near-real time, or in one or more offline processes, via the network 780. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 712 or the processor 776, or any other computers or control systems utilized by the aerial vehicle control system 710 or the data processing system 770, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or include signals that may be downloaded through the Internet or other networks.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the implementations disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language, such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially," as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An unmanned aerial vehicle ("UAV") apparatus, comprising:
   a plurality of propulsion mechanisms that generate a lift sufficient to enable aerial navigation of the UAV and a payload;
   a frame that extends around a perimeter of the plurality of the propulsion mechanisms;
   a payload engagement mechanism configured to selectively engage and disengage the payload such that the payload can be aerially transported by the UAV to a delivery area when the payload is engaged by the payload engagement mechanism and such that the payload can be delivered to a delivery location within the delivery area when the payload engagement mechanism releases the payload;
   a delivery shroud coupled to the frame and positioned around the plurality of propulsion mechanisms; and
   a delivery shroud controller configured to selectively:
      retract the delivery shroud such that the delivery shroud occupies a first space around the plurality of propulsion mechanisms; and
      extend the delivery shroud such that the delivery shroud extends downward from the aerial vehicle and occupies a second space below the plurality of propulsion mechanisms; and wherein the delivery shroud reduces a transmission of a sound generated by the aerial vehicle toward the delivery area.

2. The UAV apparatus of claim 1, the delivery shroud including:
a sound dampening material positioned along an interior of the delivery shroud that reflects at least a portion of the sound upward toward the aerial vehicle and away from the delivery area.

3. The UAV apparatus of claim 1, the delivery shroud including:
a material that is extended when the delivery shroud occupies the second space, the material forming a cavity that extends below the aerial vehicle such that airflow from the plurality of propulsion mechanisms can pass through the cavity of the delivery shroud.

4. The UAV apparatus of claim 1, wherein:
the payload includes an item ordered from an electronic commerce website.

5. The UAV apparatus of claim 1, wherein:
the delivery shroud is formed of a material; and
the material is selected to at least one of absorb at least a portion of the sound, reflect at least a portion of the sound upward, or diffuse at least a portion of the sound into a plurality of directions.

6. An aerial vehicle apparatus, comprising:
a propulsion mechanism;
a frame that extends around at least a portion of a perimeter of the propulsion mechanism;
a delivery shroud coupled the frame and positioned around the propulsion mechanism; and
a delivery shroud controller configured to selectively:
retract the delivery shroud into a retracted position such that the delivery shroud is retracted toward the frame; and
extend the delivery shroud into an extended position such that the delivery shroud extends downward from the aerial vehicle; and
wherein the delivery shroud reduces a transmission of at least a portion of a sound generated by the propulsion mechanism toward an area below the aerial vehicle.

7. The aerial vehicle apparatus of claim 6, wherein the delivery shroud includes:
a flexible material that may be extended or retracted between the retracted position and the extended position; and
a cable coupled to the flexible material, the cable configured to be extended or retracted such that the cable will cause the flexible material to transition between the retracted position and the extended position.

8. The aerial vehicle apparatus of claim 6, wherein:
when the delivery shroud is in the retracted position the aerial vehicle has first aerodynamic properties; and
when the delivery shroud is in the extended position:
the transmission of the at least a portion of the sound toward the area below the aerial vehicle is reduced; and
the aerial vehicle has second aerodynamic properties that are less aerodynamic then the first aerodynamic properties.

9. The aerial vehicle of claim 6, wherein the delivery shroud includes a first material that is formed of at least one of a Kevlar material, a foam material, a fabric material, a plastic material, a synthetic material, a wool material, a cotton material, a fiber material, a feather, a polyethylene material, sawdust, a paper material, or a fiberglass material.

10. The aerial vehicle of claim 6, wherein:
the delivery shroud forms a column that extends below the propulsion mechanism when the delivery shroud is in the extended position; and
the column includes a cavity through which airflow from the propulsion mechanism may pass.

11. The aerial vehicle apparatus of claim 10, wherein:
an interior of the cavity includes a plurality of ridges oriented to cause the at least a portion of the sound to reflect off the plurality of ridges and upward toward the aerial vehicle.

12. The aerial vehicle apparatus of claim 10, wherein:
an interior of the cavity includes a plurality of baffles that absorb the at least a portion of the sound.

13. The aerial vehicle apparatus of claim 6, further comprising:
a second propulsion mechanism;
a second delivery shroud positioned below the second propulsion mechanism; and
wherein the delivery shroud controller is further configured to selectively:
retract the second delivery shroud into a second retracted position such that the second delivery shroud is retracted toward the frame; and
extend the second delivery shroud into a second extended position such that the second delivery shroud extends downward from the aerial vehicle; and
wherein the second delivery shroud reduces a transmission of at least a portion of a second sound generated by the second propulsion mechanism toward the area below the aerial vehicle.

14. The aerial vehicle apparatus of claim 13, wherein the delivery shroud and the second delivery shroud are independently controlled by the delivery shroud controller such that the delivery shroud may be placed in the extended position and the second delivery shroud may be placed in the second retracted position.

15. A method to reduce at least a portion of sound transmitted from an aerial vehicle toward a delivery area, the method comprising:
determining that an altitude of the aerial vehicle is below a defined altitude; and
causing a delivery shroud that is coupled to the aerial vehicle to be extended in a downward direction from the aerial vehicle, wherein:
the delivery shroud forms a column below the aerial vehicle;
the column includes a cavity through which airflow from the aerial vehicle can pass;
at least a portion of sound waves of the sound are influenced by the delivery shroud such that the at least a portion of the sound waves do not travel in a direction of the delivery area;
determining that the aerial vehicle is positioned above a delivery location within the delivery area;
causing a payload to be released from the aerial vehicle and positioned at the delivery location; and
causing the aerial vehicle to depart the delivery area.

16. The method of claim 15, further comprising:
subsequent to causing the payload to be released:
determining that the aerial vehicle is above the defined altitude; and
causing the delivery shroud to be retracted toward the aerial vehicle.

17. The method of claim 15, wherein influence of the at least a portion of the sound waves includes at least one of reflecting the at least a portion of the sound waves, absorbing the at least a portion of the sound waves, or diffusing the at least a portion of the sound waves.

18. The method of claim 15, further comprising:
subsequent to causing the delivery shroud to be extended, causing the aerial vehicle to continue a descent toward the delivery location within the delivery area.

19. The method of claim 18, wherein determining that the aerial vehicle is positioned above the delivery location includes determining that the aerial vehicle has reached a second defined altitude.

20. The method of claim 15, wherein the payload travels through the cavity when released from the aerial vehicle.

* * * * *